Nov. 18, 1958           W. W. GREEN           2,860,397
SAFETY PIN
Filed May 2, 1957
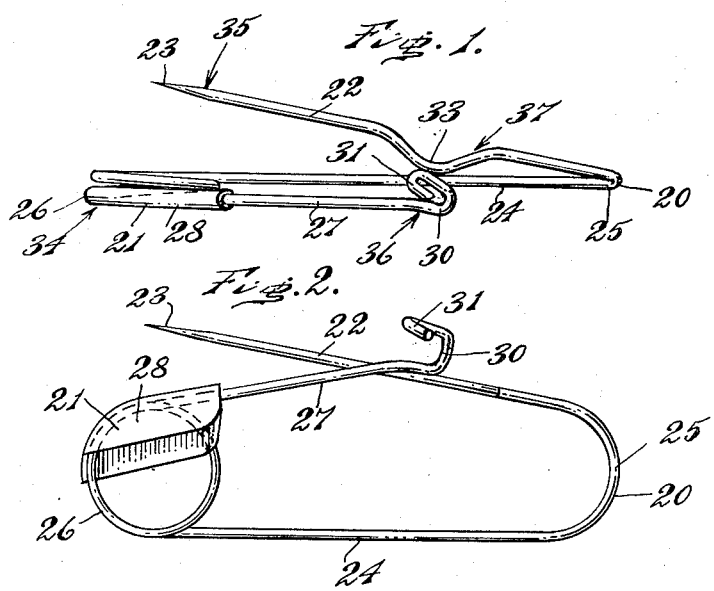
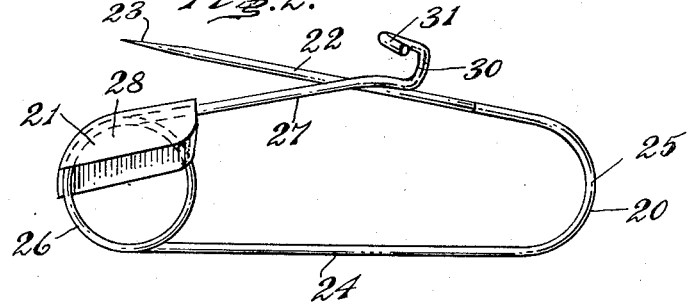
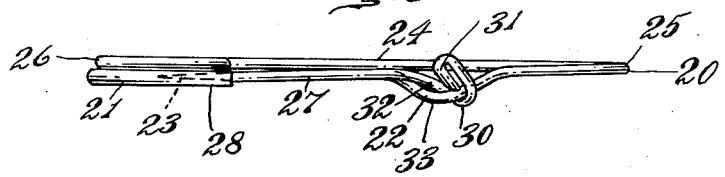
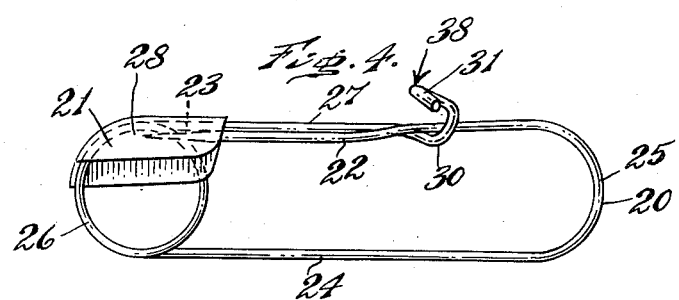
INVENTOR
Walter W. Green
BY
ATTORNEYS

2,860,397
SAFETY PIN

Walter W. Green, Linwood, Pa.

Application May 2, 1957, Serial No. 656,543

1 Claim. (Cl. 24—156)

The present invention relates to a locking safety pin which is protected against unintentional opening as by a child.

A purpose of the invention is to provide opposite spring wire reverse band portions connected by a straight portion and carrying a pointed pin portion which engages in a socket on one of the reverse bend portions, and to extend from the socket a spring lever provided with a hook which locks with the pointed pin portion in closed position.

A further purpose is to force down on the pointed pin portion to unlock.

A further purpose is to laterally bend the pointed pin portion so as to unlock.

A further purpose is to provide a spiral loop at the reverse bend adjoining the socket.

Further purposes appear in the specification and in the claim.

In the drawings I have chosen to illustrate one only of the numerous embodiments in which my invention may appear, selecting the form shown from the standpoints of convenience in illustration, satisfactory operation and clear demonstration of the principles involved.

Figure 1 is a top plan view of the pin of the invention opened.

Figure 2 is a side elevation of the pin of Figure 1.

Figure 3 is a top plan view of the pin of the invention closed and locked.

Figure 4 is a side elevation of Figure 3.

In the prior art, difficulty has been encountered through unintentional opening of safety pins either by children, or through pressure applied by someone who did not realize that it would have the effect of opening the pin.

The present invention is concerned with a locking safety pin which is safe against unintentional opening, but can be quickly and automatically opened intentionally by an adult, and also can be quickly closed.

The pin of the invention is desirably made from spring wire plus a pin engaging socket which is suitably of sheet material. Brass, bronze, steel or stainless steel may conveniently be used.

As shown, the safety pin of the invention comprises a single piece of spring wire 20 and a sheet metal socket 21 which are united to the wire as by crimping, soldering or spot welding.

The spring wire 20 is composed of a pointed pin portion 22 having a pointed end 23 which extends generally straight in spaced relation to a back stretch of wire 24 which in closed position is suitably parallel to the pointed portion 22, connected by a reverse bend 25 at one end joining the pointed pin portion and the back stretch, and having a reverse bend portion 26 at the other end of the backstretch which preferably as shown takes the form of a helical wire coil. At the remote end of the helical wire coil 26, the wire extends out in a locking lever 27.

Over the base of the locking lever where it joins the helical coil 26 a U-shaped safety pin socket 28 is placed and crimped in position around the wire, forming a bottom opening receptacle which in closed position of the safety pin receives the point 23 as well known in the art.

The locking lever at its remote end which is adjacent the middle of the pointed portion 22 has a laterally opening hook portion 30 which is adapted to extend around and engage the pointed pin portion 22. To protect against injury to personnel, the outer end of the wire has an abrupt reverse bend at 31, which also provides a handle for gripping the hook.

To facilitate the insertion of the hook and to permit the hook lever to extend over the top of the pointed pin portion in closed position of the pin, the hook end is desirably bent at 32 around and under the pointed pin portion, and there is a side bend 33 on the pointed pin portion opposite the hook end which extends toward the base of the hook end in locking position.

While of course the user can manipulate the pin as is most convenient to him, the preferred operation is as follows:

With the pin open as in Figures 1 and 2, the point is inserted through both sides of the cloth and the pin is rotated an additional half turn in the cloth, carrying the cloth around the reverse bend 25, so that the cloth is secured on the back stretch 24 rather than on the pointed pin portion 22.

In order to close, the user desirably places his left thumb at 34 adjoining the side of the socket, and his left forefinger at 35 adjoining the opposite side of the point. The right thumb is placed at 36 adjoining the side of the hook corresponding to the side 34, and the right forefinger squeezes at 37 to bring the side bend 33 into the hook. The point is flipped over the top of the socket and brought in under the socket and raised into engagement in the socket space. This leaves the pin closed as in Figures 3 and 4.

To open it is merely necessary for the user if a strong adult to press down firmly at 33 in Figure 4 on the hook and the side loop of the pointed pin portion, deflecting the pin toward the back stretch and causing the hook to spring out of engagement and causing the point to leave the socket. A person who does not have the strength to accomplish this can still open the pin by separately grasping the pointed portion just back of the point with the fingernail and prying the pin out of the socket and allowing the pointed portion to come up and then moving it around over the locking lever and out of engagement with the hook.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a safety pin, a pointed pin portion of spring wire extending toward one end of the pin, a first reverse bend portion of U formation on the spring wire connected to the pointed pin portion at the opposite end of the pin, a backstretch of spring wire connected to the opposite side of the first reverse bend portion and in spaced relation to the pointed pin portion, the backstretch being accessible to material through which the pin extends when the pin is closed, a second reverse bend portion of spring wire connected to the end of the backstretch, a socket having an open side portion at the end of the second reverse bend portion adapted to receive the pointed pin portion in closed position, a locking extension extending from the socket generally along the pointed pin portion in closed position and having a laterally open hook end which in closed position extends around and engages the pointed pin portion of the pin, there being on the pointed pin portion a bend in the wire opposite the hook in the direction toward the base of the hook, the bend in closed position of the safety pin carrying the pointed pin portion in the open hook and under the locking lever to engage in the socket, the point of the pointed pin portion when engaged in the socket being located between the locking extension in the socket and the open side of the socket.

References Cited in the file of this patent

UNITED STATES PATENTS

| | | |
|---|---|---|
| 193,125 | Miles | July 17, 1877 |
| 661,281 | Urbach et al. | Nov. 6, 1900 |
| 712,819 | Lippincott | Nov. 4, 1902 |
| 2,580,087 | Garber | Dec. 25, 1951 |

FOREIGN PATENTS

| | | |
|---|---|---|
| 1,128,237 | France | Aug. 20, 1956 |